Feb. 9, 1943.  J. F. PRICE  2,310,868
MACHINE FOR APPLYING HOOD CAPS
Filed July 17, 1940  11 Sheets—Sheet 2

INVENTOR:
John F. Price,
BY Bodell & Thompson
ATTORNEYS.

Feb. 9, 1943.  J. F. PRICE  2,310,868
MACHINE FOR APPLYING HOOD CAPS
Filed July 17, 1940  11 Sheets-Sheet 3

INVENTOR:
John F. Price,
BY
Bodell & Thompson
ATTORNEYS

Feb. 9, 1943.     J. F. PRICE     2,310,868
MACHINE FOR APPLYING HOOD CAPS
Filed July 17, 1940     11 Sheets-Sheet 5

_FIG_5_

INVENTOR:
John F. Price,
BY Bodell & Thompson
ATTORNEYS.

INVENTOR:
John F. Price,
BY Bodell & Thompson
ATTORNEYS.

Feb. 9, 1943. J. F. PRICE 2,310,868
MACHINE FOR APPLYING HOOD CAPS
Filed July 17, 1940 11 Sheets-Sheet 7

INVENTOR:
John F. Price,
BY Bodell & Thompson
ATTORNEYS.

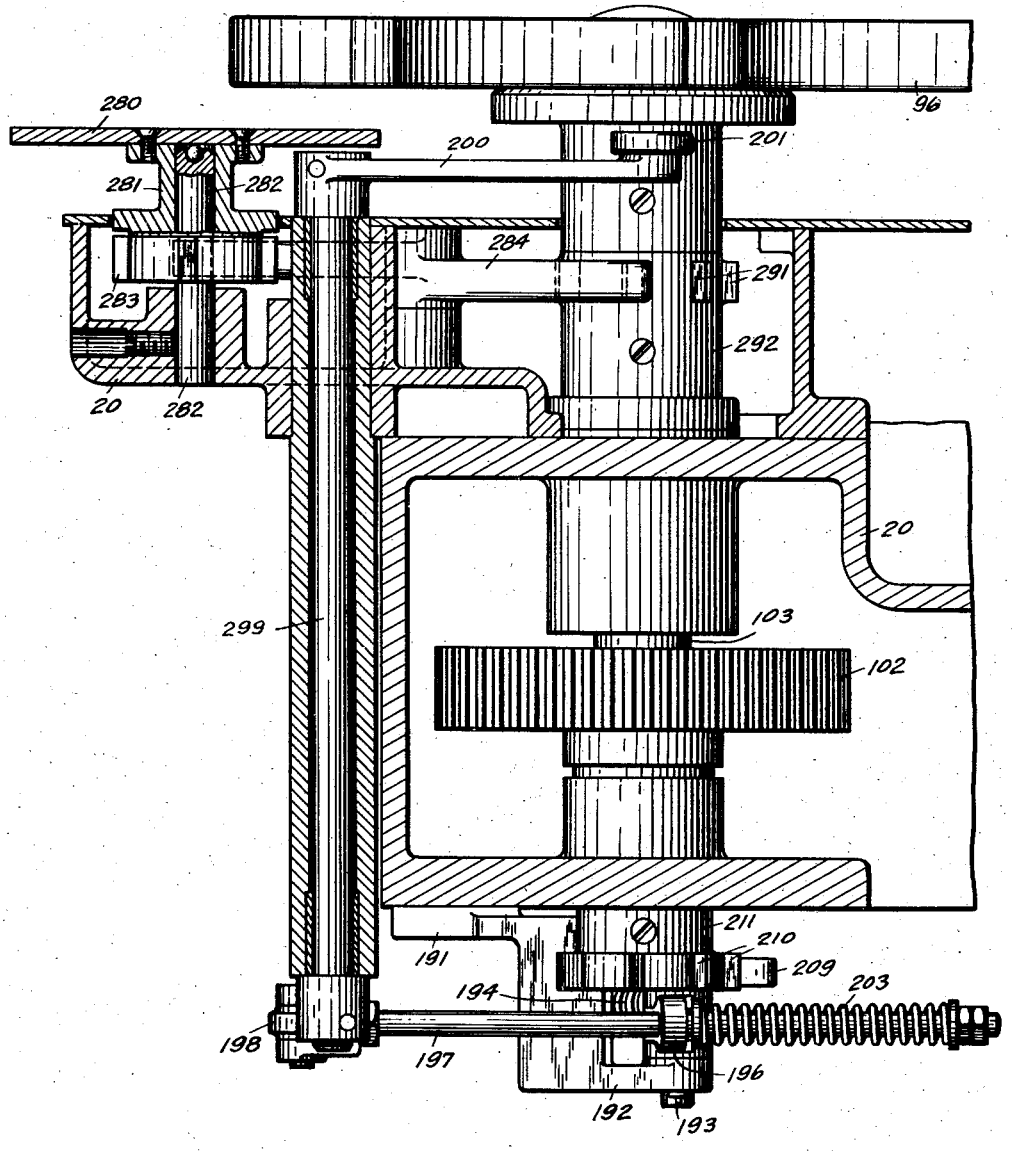

Feb. 9, 1943. J. F. PRICE 2,310,868
MACHINE FOR APPLYING HOOD CAPS
Filed July 17, 1940 11 Sheets-Sheet 9
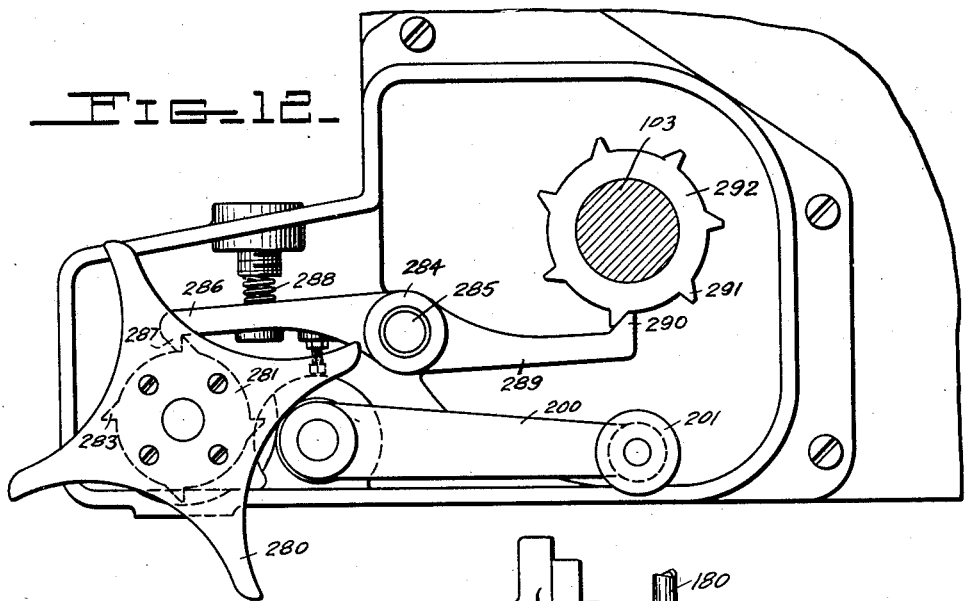
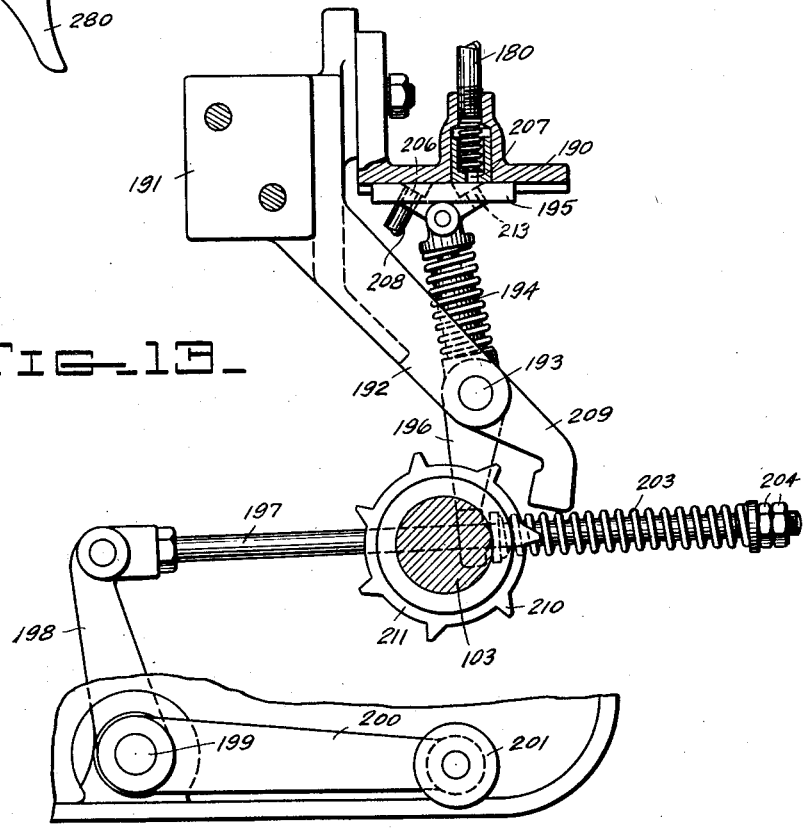
INVENTOR:
John F. Price,
BY Bodell & Thompson
ATTORNEYS.

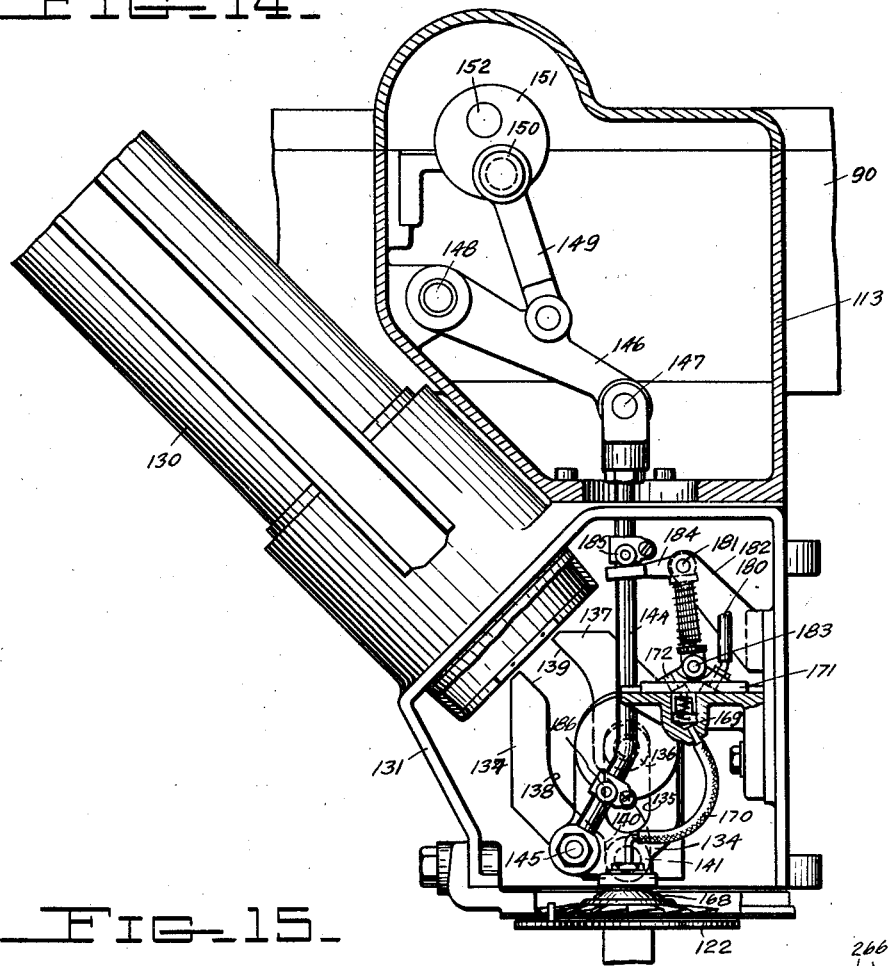

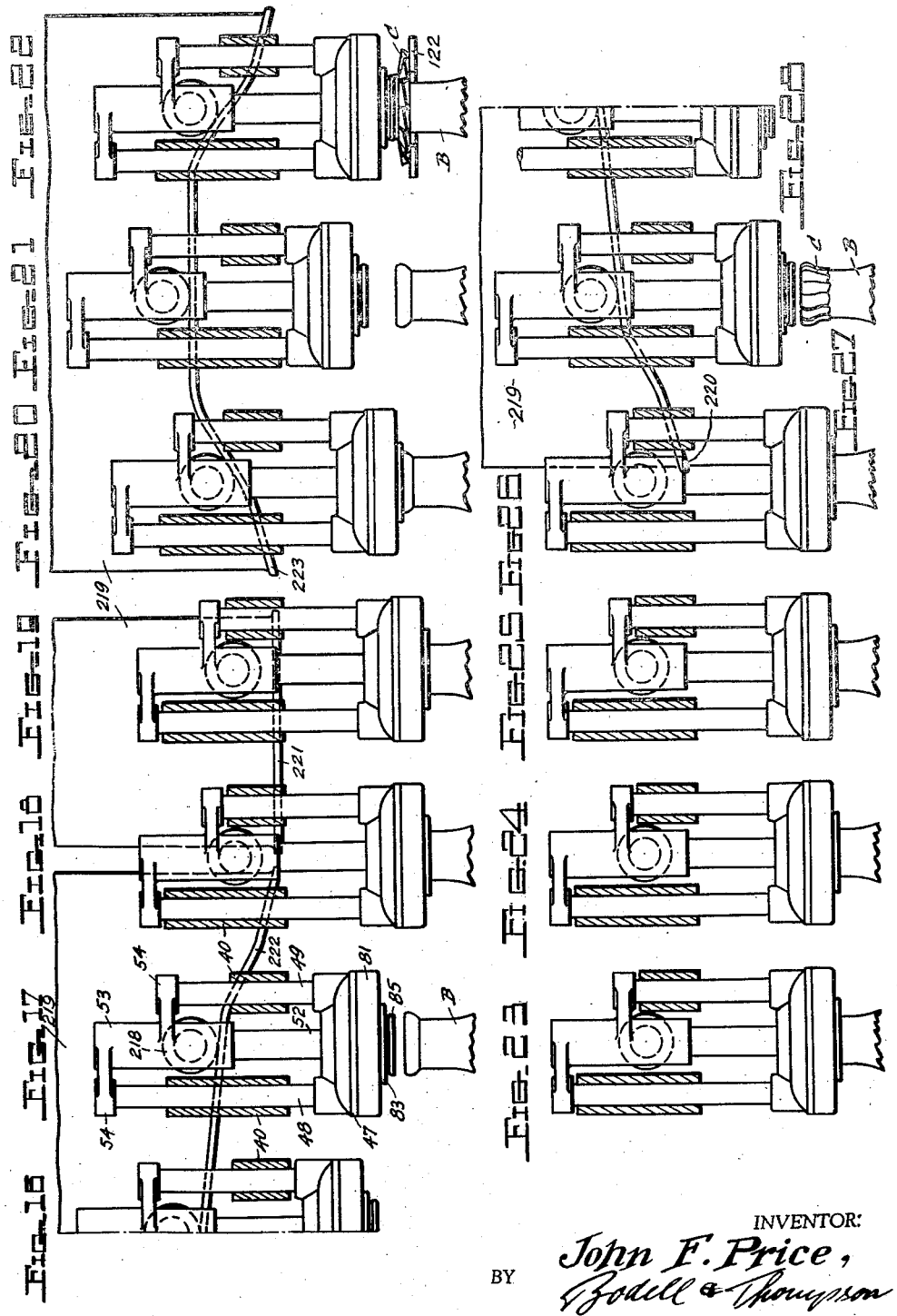

Patented Feb. 9, 1943

2,310,868

UNITED STATES PATENT OFFICE 2,310,868

MACHINE FOR APPLYING HOOD CAPS

John F. Price, Fulton, N. Y., assignor to Oswego Falls Corporation, Fulton, N. Y., a corporation of New York Application July 17, 1940, Serial No. 346,014

10 Claims. (Cl. 226—83)

This invention relates to a machine for applying closures to bottles, the closures being formed from flexible sheet material and provided with a composition rendered adhesive by the application of heat to make the closures self securing on the bottles.

The invention has as an object a machine for applying closures of the type referred to and embodying a particularly economical and compact structure operable to efficiently and rapidly apply the closures to the bottles, the machine further embodying means whereby it is conveniently adjustable to accommodate different sizes of bottles.

The invention consists in the novel features and in the combinations and constructions hereinafter set forth and claimed.

In describing this invention, reference is had to the accompanying drawings in which like characters designate corresponding parts in all the views.

Figure 11 is a vertical sectional view of the bottle timing mechanism with parts shown in elevation.

Figure 12 is a top plan view of the bottle timing mechanism.

Figure 13 is a plan view of the mechanism for controlling the closure feeding means.

Figure 14 is a side elevational view of the closure transfer means and contiguous operating mechanism therefor.

Figure 15 is a fragmentary sectional view taken on line 15—15, Figure 2, including a diagram of the circuit for the motor and oven control.

Figures 16 to 28 are diagrammatic views showing successive positions of the cap contracting heads as they progress along the head raising and lowering cam track.

Figure 1:
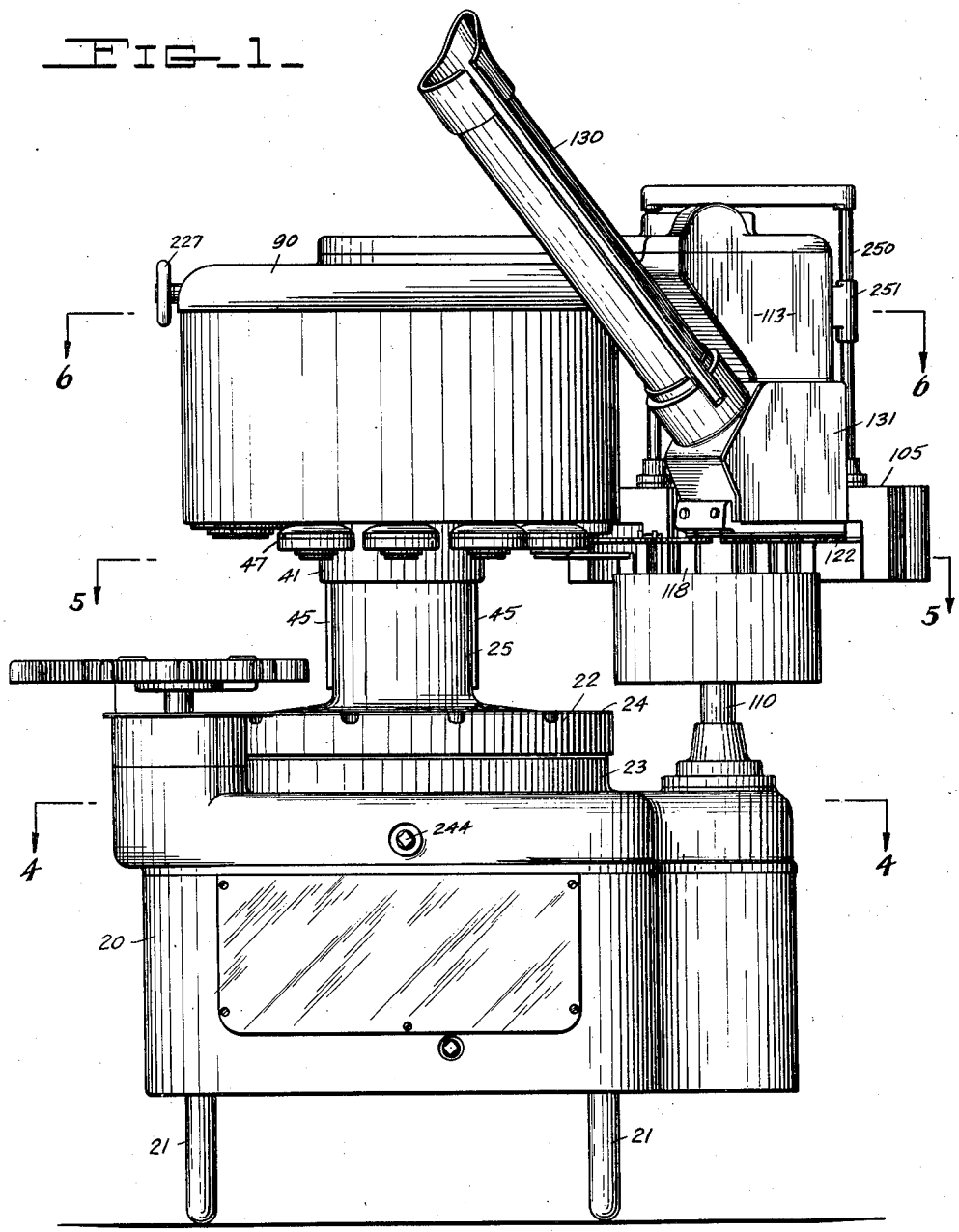
Figure 1 is a side elevational view of a machine embodying my invention.

The machine consists of a base 20 supported on legs 21. A turret 22 is journalled on the top wall 23 of the base and provided with circumferentially spaced apart bottle supporting pads 24. The turret is provided with an upwardly extending hub portion 25 rotatably mounted upon a column 26 secured to the top wall 23 of the base as by screws 27. The turret 22 is supported on an antifriction bearing 28 carried by the bottom flange of the column 26. A ring gear 30 is secured to the under side of the turret 22 and is arranged to mesh with a driving pinion 31 mounted upon the upper end of a shaft 32. The drive shaft 32 extends upwardly from a transmission 33 arranged in the base and which is driven by the motor 34 through means of a belt 35.

The super-structure of the machine is supported by a post 36 slidably mounted in the column 26, the lower end of the post being threaded into a nut 37 rotatably supported in the top wall 23 of the base as by antifriction bearing 38.

The machine includes an annular series of closure contracting heads which are supported in circumferentially spaced relation by a circular casting 40 having a depending hub portion 41 slidably fitting the hub portion 25 of the turret. The casting 40 is supported by the post 26 by an antifriction bearing 42 secured to the upper end of the casting 40 by the ring gear 43. The telescoping hub portions 25, 41 are secured against relative rotation as by keys 45.

The cap contracting heads consist of a circular body 47 secured to the lower ends of spaced rods 48, 49 which are slidably mounted in apertures formed in the periphery of the casting 40. The arrangement is such that a head is positioned above each bottle pad 24.

The heads also include an annular member 50 having a hub portion 51 journalled in the top wall of the body 47 and which is fixedly secured to a stem 52 extending upwardly between the rods 48, 49. The upper portion of the stem 52 is journalled in a bracket 53 having radially extending arms 54 secured to the upper ends of the rods 48, 49 respectively as by nuts 55.

Collars 56, 57 are arranged on the upper end of the stem 52. The collar 56 is secured to the stem as by key 58, while the collar 57 is rotatably mounted upon the stem. The collars 56, 57 are maintained against axial movement by an adjustable collar 59 secured in place as by screw 60. The collar 56 forms the hub portion of an angle arm 61 having a roller 62 mounted at the bight thereof and a rod 63 secured to the outer end of the arm as by a pin 64. The collar 57 forms the hub portion of a triangular shaped arm having side members 65 and a base 66. A roller 67 is mounted at one end of the base 66, and the opposite end of the base is formed with a boss 68 having an aperture to slidably receive the free end of the rod 63. A helical compression spring 69 is arranged on the rod 63 and interposed between the arm 61 and the boss 68, all whereby the collars 56, 57 are yieldingly rotated in opposite directions. This structure is employed to effect opening and closing of the contracting members of the head to contract the marginal or skirt portion of the closure about the neck of the bottle.

Figure 10:
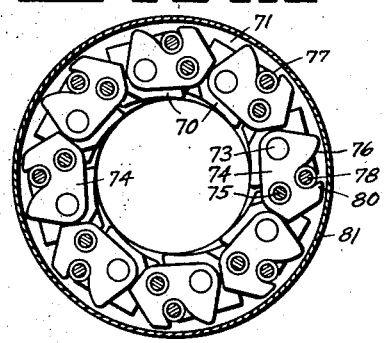
Figure 10 is a view taken on a line corresponding to line 10—10, Figure 8.

The closure contracting mechanism of the head is identical with that disclosed in the co-pending application of Edward N. Lowry, Sr., No. 320,366, which application is owned by applicant's assignee. Briefly described, this mechanism consists of an annular series of closure engaging members 70 of general rectangular formation mounted for radial movement in a guide plate 71. The inner edge 72 of the members 70 is formed on a radius roughly that of the neck of the container or bottle, and each of the members is provided with a pin 73. The closure contracting members 70 are moved radially by cam members 74 pivotally mounted at one end on the pins 73 of the respective closure contracting members and are pivotally mounted at their opposite ends on pins 75 depending from the annular member 50. The cam members 74 are normally arranged end to end, as shown in Figure 10, and the outer side of each cam member is formed with a slot having a cam surface 76. This cam surface is cooperable with a roller 77 mounted upon a pin 78 extending into the body 47 of the head. Accordingly, when the pins 75 are moved in a clockwise direction Figure 10, the free ends of the cam members and the closure contracting members 70 are urged inwardly by the cam surface 76 of each cam member engaging the respective rollers 77 mounted on the stationary pin 78. Upon clockwise movement of the annular member 50, the cam members are likewise moved in a counterclockwise direction and when the points 80 engage the rollers 77 the cam members are moved about their pivot pins 75 and the free ends of the cam members and the members 70 are moved radially outwardly. This mechanism provides a substantially continuous jaw to effect even and uniform contraction of the skirt portion of the closure against the neck of the bottle.

The cap contracting members 70 and guide plate 71 are arranged in a cup shaped member 81 secured to the lower portion of the body 47 as by screws 82. The member 81 is provided with a central aperture in which an annular member 83 is arranged and which functions to engage and fold the marginal portion of the closure about the neck of the bottle. A stem 84 is slidably mounted in the tubular stem 52 and is provided at its lower end with a pad or disk 85, and the upper end of the stem 84 is provided with a collar 86 to limit the downward movement of the stem in which position the pad 85 is arranged slightly below the forming ring 83. The function of the pad 85 is to engage the top of the closure positioned on the bottle and to hold the same on the bottle during the downward movement of the head and the folding of the marginal portion of the closure about the top of the bottle.

The rotation of the annular member 50 is effected by engagement of the rollers 62, 67 with cam tracks carried by a supporting member 87 secured to the upper end of the post 36 as by screws 88. The supporting member 87 is formed with an upper radial flange 89 on which the top casting 90 of the machine is mounted, and a lower radial flange 91 to which cam sections 92, 93 are secured as by screws 94. The rollers 67 engage the cam sections 92, 93 and in doing so effect clockwise movement of the annular member 50 to move the cap contracting members 70 radially inwardly.

From the description thus far, it will be apparent that the annular series of cap contracting heads rotate in unison with the turret 22. The bottles are conveyed to and from the machine by a conventional conveyor 95 arranged to extend across the front side of the base 20. The bottles B are fed from the conveyor 95 to the turret 22 by a star wheel 96 and the capped bottles are moved from the turret back onto the conveyor 95 by an out-feed star wheel 97. A guide member 98, arranged on pins 99 extending upwardly from the top side of the base, cooperates with the star wheels 96, 97 to properly guide the bottles to and from the turret.

Figure 4:
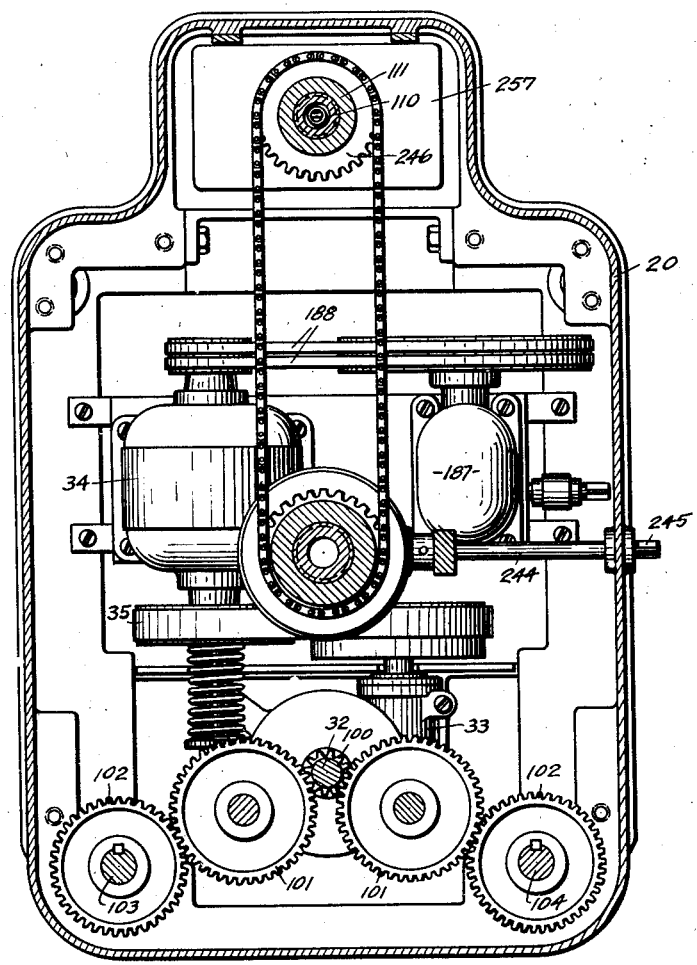
Figure 4 is a transverse sectional view taken through the base of the machine on substantially line 4—4, Figure 1.

Referring to Figure 4, the shaft 32 is provided with a pinion 100 arranged to mesh with a pair of idle gears 101 and each of these gears meshes with a driven gear 102, one of which is mounted upon a shaft 103 to the upper end of which the in-feed star wheel 96 is mounted, and the other gear 102 is secured to a shaft 104, to the upper end of which the out-feed star wheel 97 is secured. Accordingly, the star wheels 96, 97 also rotate in unison with the turret 22.

The closures C are heated to render the same self-securing on the bottles by an oven structure indicated generally at 105. This oven consists of a casing having inner and outer insulated side and top walls 106, 107. The casing is of general arcuate formation and a plurality of heating elements 109 are arranged within the casing. The ends of the casing are open and the closures C are moved through the casing in heat exchanging relation to the elements 109 by means of a rotary conveyor supported on the post 110. The lower end of the post 110 is threaded into a nut 111 journalled in the top wall 23 of the base, see Figure 3, and the upper end of the post is mounted in a boss 112 depending from a housing 113 forming a rearwardly continuation of the top casting 90. The post 110 is formed with a fixed collar 114 for supporting a conical shaped member 115 which is secured against rotation by set screw 116, and the base portion of the member 115 is formed with a flange 117 forming a cam track for raising and lowering the closure carrying members of the rotary conveyor.

The conveyor consists of a cylindrical member 118 having an elongated hub 119 supported by the member 115 and rotatably journalled upon the upper portion of the post 110. The periphery of the member 118 is formed with a plurality of circumferentially spaced apart axially extending slots to slidably receive posts 120, the lower end of each post being provided with a roller 121 engaging the cam track 117. The upper end of each post is provided with a forked shaped member 122 which serves as closure carrying members to convey the caps through the oven and to deposit the heated caps on the tops of the bottles arranged on the pads 24 of turret 22.

The caps or closures are arranged in stack formation in a magazine tube 130 extending upwardly at an angle from the casing 131 depending from the housing 113. Cap transfer mechanism is arranged in the casing 131, and the casing is mounted in juxtaposition to the cap conveyor, whereby the cap transfer mechanism is operable to remove caps from the tube 130 and deposit the same on the forked members 122 just prior to the time that each of said members enters the oven 105.

This cap transfer mechanism consists of a block 134 provided with an elongated slot 135 to receive a pin 136 extending outwardly from a block 137 fixedly secured to the inner wall of the housing 113. The block 137 is formed with an arcuate slot 138 terminating at each end in a straight portion 139, 140. The upper straight portion 139 extends parallel to the axis of the closure magazine 130, and the lower straight portion 140 extends vertically, or at right angles, to the closure conveying turret. The block 134 is provided with a roller 141 arranged to travel in the slot 138, and the block is oscillated about the pin 136 by a link 144 pivotally secured to the block 134 as by cap screw 145 and being pivotally connected at its upper end to a link 146, as at 147. The opposite end of the link 146 is pivoted to the side wall of the housing 113 as at 148 and is pivotally connected intermediate its ends to a connecting rod 149, the opposite end of which is mounted upon a pin 150 carried by a crank disk 151 secured to one end of a shaft 152, the opposite end of which is provided with a pinion 153 arranged to mesh with a gear 154. The gear 154 is mounted upon the upper end of a shaft 155 journalled vertically in the machine with a gear 156 secured to the upper end of the shaft immediately below the gear 154 and being operatively connected with a gear 160 through idler gears 161, 162. The gear 160 is secured to the upper end of a shaft 163 also journalled vertically in the frame and being provided at its lower end with a pinion 164 arranged in mesh with the ring gear 43 secured to the upper end of the casting 40.

It will be apparent from the drive mechanism above described that the shaft 155 is rotated continuously and in unison with the turret 22 and that the block 134 is oscillated about the pin 136 and the end of the block to which the link 144 is connected is caused to travel from a position adjacent the lower end of the magazine 130 to the position shown in Figure 14, and to return from this position to its upper position. In other words, the free end of the block 134 oscillates between the lower end of the magazine 130 and a point in juxtaposition to the closure carrying forks 122. The free end of the block is provided with a conventional suction cup 168 which is connected to a stationary valve member 169 by a flexible tube 170. A movable valve member 171 is slidably mounted upon the member 169 and is provided with a vacuum port and an exhaust port. When the suction cup 168 is arranged in juxtaposition to the forked members 122, as shown in Figure 14, the valve member 171 is shifted, as indicated in that figure, to move the exhaust port 172 in register with the port in the member 169 to which the tube 170 is connected. When the suction cup 168 is moved up in juxtaposition to the lowermost cap in the magazine 130, the valve member 171 is shifted to the left, Figure 14, to move the vacuum port to which the tube 180 is connected in register with the tube 170. The valve member 171 is shifted from one position to the other by means of an angle lever pivoted at 181 to a bracket 182, one end of the lever being pivotally connected as at 183 to the valve member 171, and the opposite arm 184 of the lever being arranged in the path of stops 185, 186 adjustably mounted on the link 144.

Vacuum is supplied to the valve mechanism 169, 171 by a suitable vacuum pump 187 arranged in the base of the machine and driven by belts 188 from motor 34, see Figure 4. The vacuum tube 180 is not connected directly to the air pump, but through a second valve mechanism which is operable upon the transfer of each bottle onto the turret by the star wheel 96.

The vacuum tube 180 extends from the valve member 190 mounted upon a bracket 191 arranged in the base of the machine and provided with a laterally extending arm 192. A lever is journalled intermediate its ends on a pin 193 carried at the outer end of the arm 192. One arm 194 of the lever is pivotally connected to a movable valve member 195 and the arm 196 is provided with an aperture to slidably receive a rod 197 which is pivotally connected at one end to an arm 198 secured to the lower end of a shaft 199. The shaft 199 is journalled vertically and is provided on its upper end with an arm 200 having a roller 201 at the free end thereof and arranged below the in-feed star wheel 96 and in the path of the bottles being fed onto the turret by the star wheel.

The rod 197 extends through the arm 196 and the opposite end is provided with a helical compression spring 203 arranged between nuts 204 and the arm 196. With this arrangement, a bottle being fed onto the turret by the star wheel 96 engages the roller 201 causing the shaft 199 to be oscillated in a counter-clockwise direction Figure 13, and the rod 197 moved to the left whereby the arm 194 is caused to move to the right, shifting the movable valve member 195 to effect register of the port 206 with the port 207 to which the vacuum tube 180 is connected. The port 206 is connected by a flexible tube 208 to the vacuum pump 187.

The valve actuating lever is also provided with an arm 209 extending in angular relationship, and the free end of which is moved into the path of the lobes 210 formed on a cam 211. That is, when the valve member 195 has been shifted to connect the tube 180 with the vacuum pump 187, the outer end of the arm 209 is moved radially inwardly toward the cam 211 whereby it will be engaged by the next cam lobe 210. The cam member 211 is secured to the lower end of the shaft 163 to the upper end of which the star wheel 96 is mounted as previously explained. The cam member 211 is fixed in a predetermined position relative to the pockets in the star wheel 96 so that the arm 209 is moved outwardly when each bottle has traveled a predetermined distance after engagement with the roller 201. This outward movement of the arm 209 causes the valve actuating lever to be oscillated about the pivot 193 to the position shown in Figure 13 and thereby effecting registration of the exhaust port 213 with the port 207.

Figure 3:
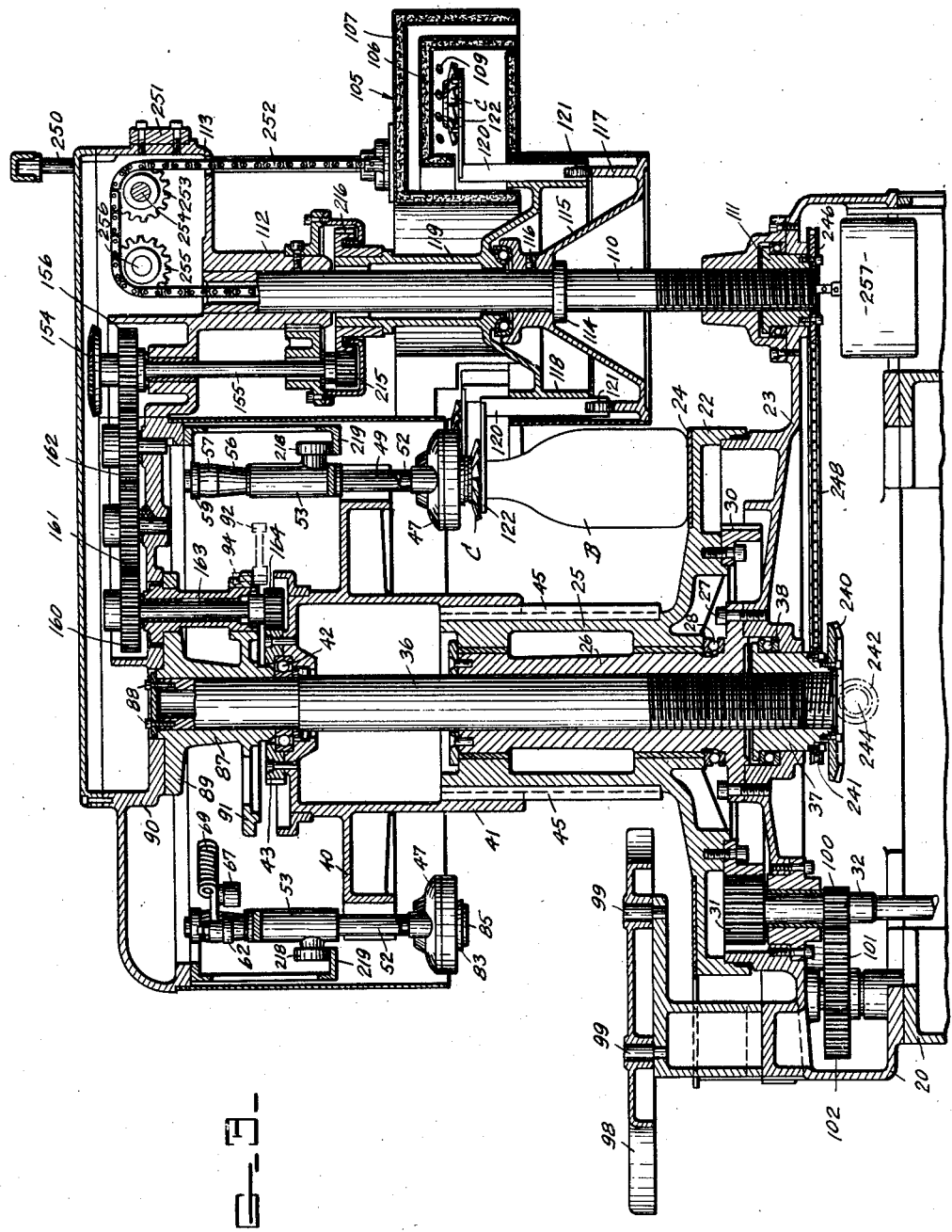
Figure 3 is a vertical sectional view of the upper portion of the machine, taken substantially on line 3—3, Figure 2.

As each bottle is progressed by the star wheel 96, the vacuum pump 187 is operatively connected to the suction cup 168 to make vacuum available thereto. During this movement of the bottle, the drive mechanism of the machine previously described functions to cause oscillation of the cap transfer block 134 and the valve mechanism 169, 171 controlled thereby to effect transfer of the lowermost cap from the magazine 130 and to deposit that cap on one of the cap carrying fork members 122. These fork members are also rotated in unison with the various moving elements of the machine by means of a pinion 215 secured to the lower end of the shaft 155 and arranged to mesh with a ring gear 216 secured to the hub 119 of the cap conveyor, as illustrated in Figure 3.

Figure 5:
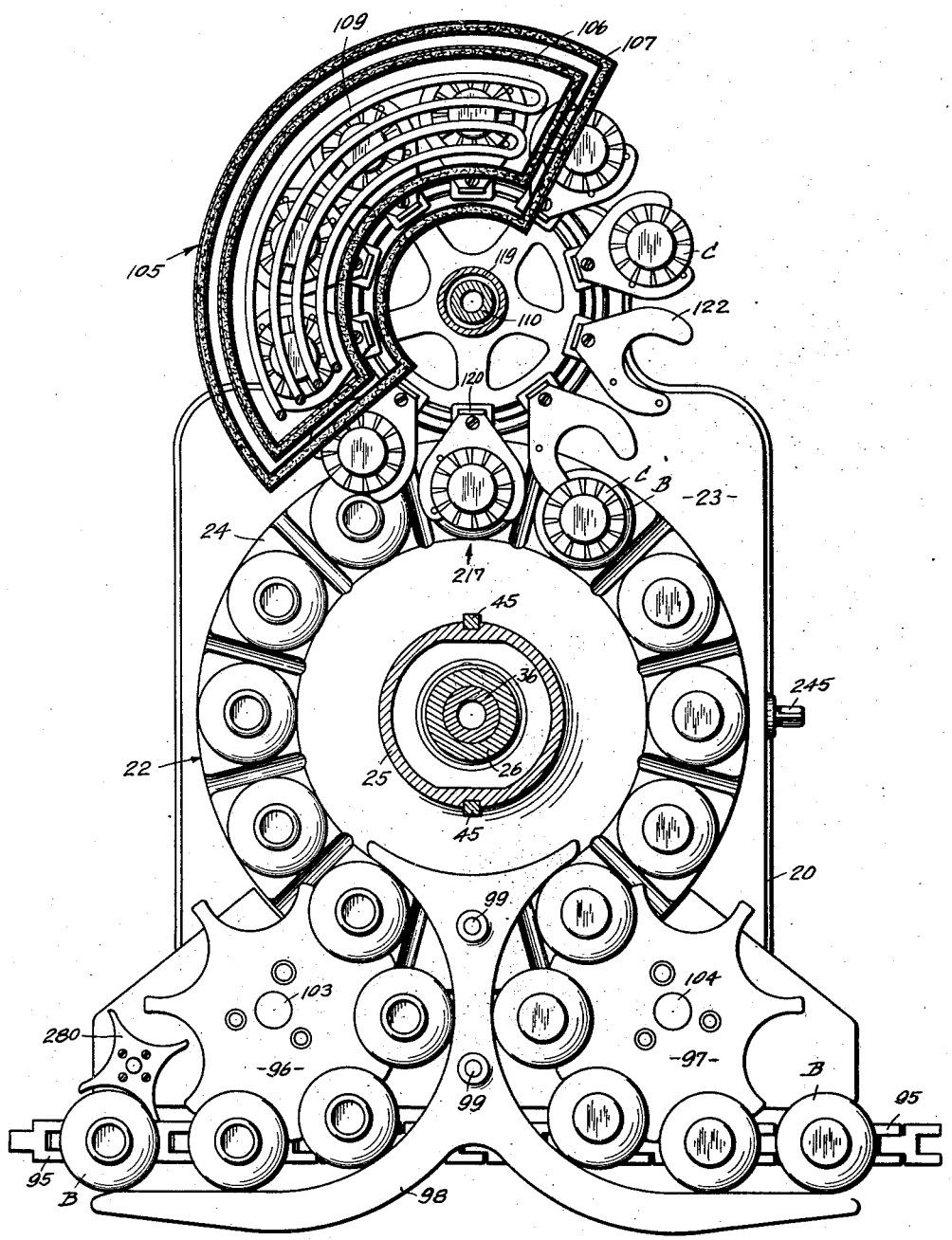
Figure 5 is a view taken on line 5—5, Figure 1.

As a bottle is advanced by the turret 22, the cap deposited on the cap conveyor for that bottle is advanced through the oven 105 and the arrangement is such that when this cap has been passed through the oven and heated to proper molding condition, the bottle which actuated the lever 200 and the cap predestined therefor meet in registration, as indicated at 217, Figure 5. The cam track 117 is so arranged that the post 120 supporting the cap carrying fork on which the cap is being carried descends abruptly thereby depositing the heated cap on the top of the bottle. At the time the bottle has reached the cap receiving position 217, the cap contracting head above the bottle is arranged in elevated position.

The vertical movement of the cap contracting heads is controlled by a roller 218 secured to each of the sleeves 53 and cam tracks 219 depending from the head casting 90. These cam tracks commence at a point 220 to effect elevation of the cap contracting heads just previous to the time the capped bottles reach the out-feed star wheel 97 and continues in elevated position during their movement around the forward portion of the machine to a point past the in-feed star wheel 96. At that point, the elevated track joins a lower portion 221 by an inclined portion 222.

Figure 6:
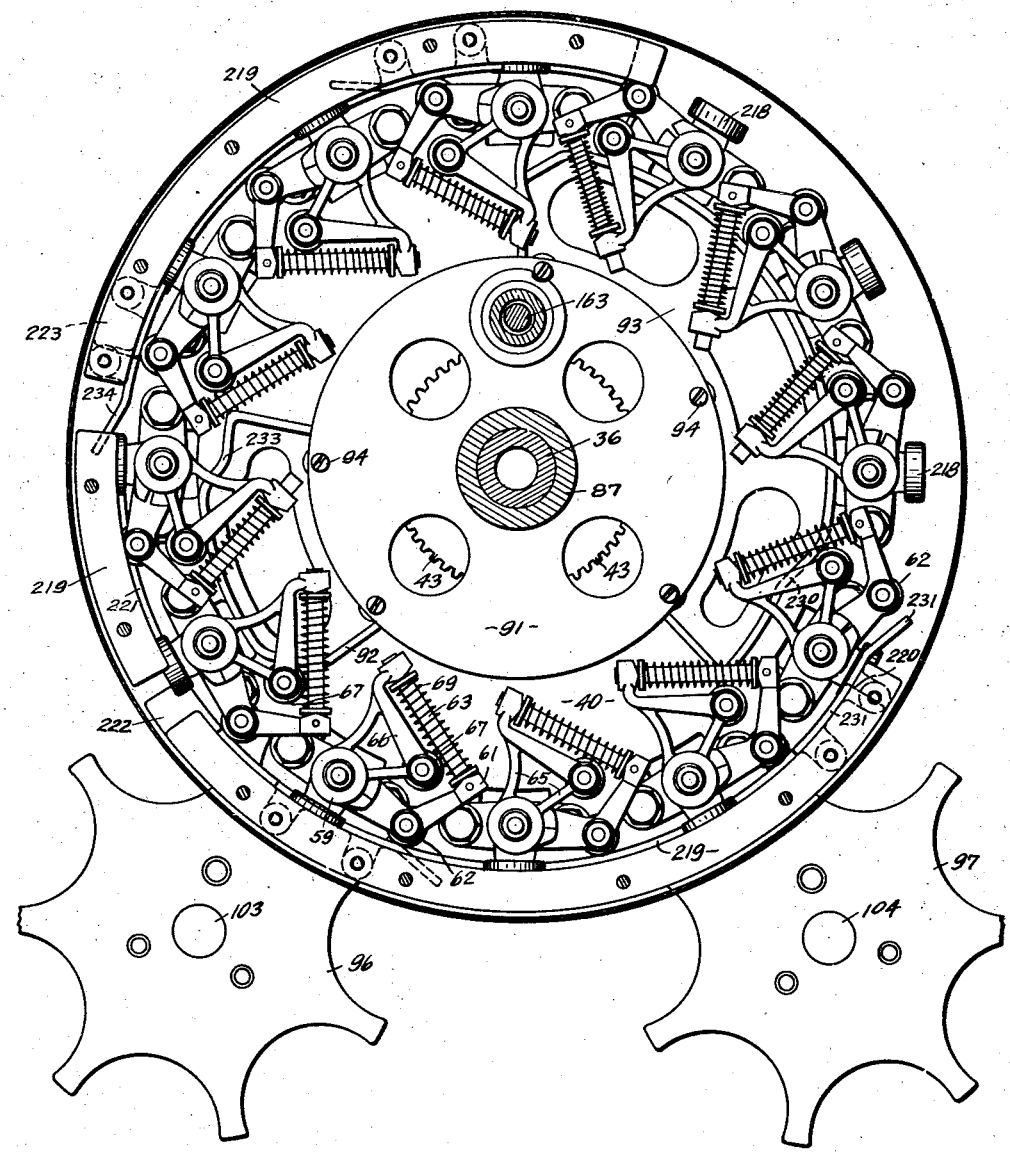
Figure 6 is a transverse sectional view through the top section of the machine substantially on line 6—6, Figure 1, with the in-feed and out-feed star wheels arranged in relative position thereto, and the closure heating mechanism omitted.
Figure 7:
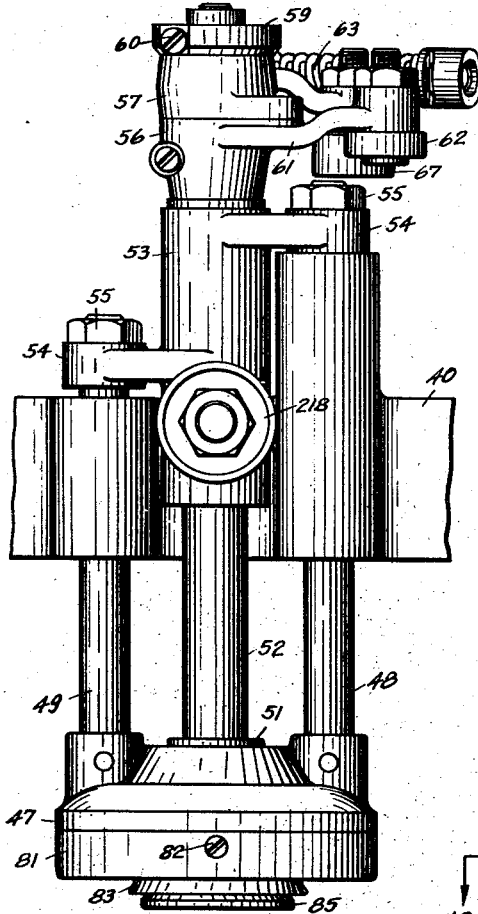
Figure 7 is a side elevational view of a closure applying head.
Figure 8:
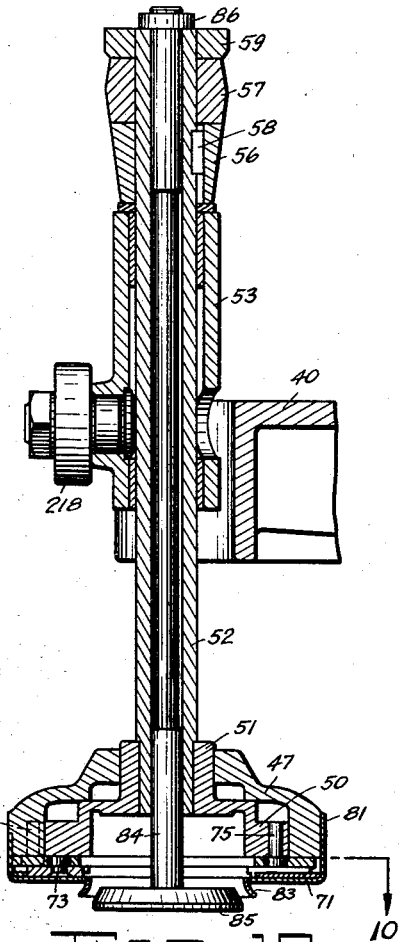
Figure 8 is a vertical sectional view of the structure shown in Figure 7.
Figure 9:
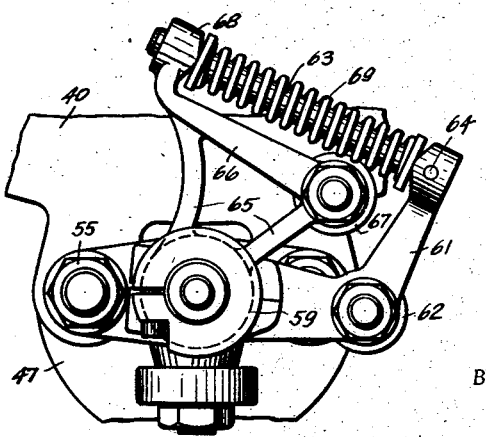
Figure 9 is a top plan view of a closure applying head.

The lower section 221 extends approximately to a point 223 Figure 6, whereupon the cam track is again elevated effecting elevation of the heads to a point beyond the cap receiving position. At this point, the heads descend to fold the closures about the tops of the bottles. That is, the heads descend until the arms 54 of sleeve 53 engage the head carrying casting 40, as illustrated in Figure 7, if no bottle is present beneath the head. If a bottle is positioned below the head, the head descends until it engages the pad 85 which is positioned on the cap on the top of the bottle. Thereupon the rollers 67 engage the cam track 92 effecting radial inward movement of the cap contracting members 70. Just previous to the time that the rollers 218 engage the beginning of the cam track 219 as at 220, the rollers 67 engage an inclined portion 230 of the cam 93 and simultaneously the rollers 62 engage an outer cam section 231 effecting positive counter-clockwise rotation of the stems 52, see Figure 6. This operation effects radial outward movement of the cap contracting members 70 and the heads remain in this open condition until the rollers 67 engage the cam section 92, at which time the rollers 218 have moved down the inclined portion 222 of the track 219 and are positioned on the lower portion 221, or the heads rest on the bottles. The cam section 92 operates, as in the case of the cam section 93, to effect closing of the heads. The purpose of lowering the heads at this time onto the tops of the uncapped bottles and contracting or closing the heads is to preliminarily position the uncapped bottle in direct axial alinement with the cap closing heads, whereby after the heated cap has been deposited on the top of the bottle, it will be contracted evenly and uniformly about the top of the bottle. As the heads advance, the rollers 67 engage the inclined section 233 of the cam 92, and the rollers 62 engage the outer track section 234 effecting opening movement of the heads. Immediately thereafter, the rollers 218 engage the remaining elevated portion of the cam track 219 and are maintained in elevated position until after the heated cap has been deposited on the top of the bottle.

Accordingly, the machine operates to advance caps and bottles successively, successively heat the caps during the advancement thereof, and to bring each cap in register with and deposit the same on the top of the bottle for which it was predestined. Thereafter and during the continuous advancement of the bottles, the heated caps are molded and contracted about the tops of the bottles and are removed from the turret by the out-feed star wheel 97.

The machine also includes mechanism for adjusting the machine to accommodate bottles of different sizes such as half-pints, pints, quarts, etc. This mechanism is operable to adjust all of the operating mechanism arranged above the turret 22 including the oven 105. As previously explained, the lower end of the post 36 is threaded into the nut 37 on the lower end of which is secured a ring gear 240 and a sprocket 241. The ring gear is arranged to mesh with a pinion indicated at 242, in dotted outline Figure 3, and which is secured on the inner end of a shaft 244 journalled transversely in the base 20 and provided at its outer end with a crank engaging surface 245. The lower end of the post 110 is threaded into the nut 111 to which a sprocket 246 is secured. Upon rotation of the shaft 244, the post 36 is adjusted vertically and the nut 111 is operated in unison with the nut 37 by means of a chain 248 trained over the sprockets 241, 246.

The oven 105 is secured to the lower end of a pair of rods 250 slidably mounted in a bracket 251 secured to the housing 113. The oven is supported by a chain 252 secured at one end to the housing of the oven and being trained over a sprocket 253 secured to a shaft 254 journalled horizontally in the housing 113 and over a sprocket 255 journalled on a pin 256 and extending downwardly through the tubular post 110. A counterweight 257 is secured to the lower end of the chain and is of sufficient weight to move the oven 105 upwardly.

The oven is maintained in lowered position with the heating elements 109 in heat exchanging relation to the caps on the cap conveyor by means of a latch 258 pivotally mounted in the casing at 259, Figure 15, and being provided with a pawl 260 arranged to engage a projection 261 formed on the side of the sprocket 253. The opposite end 262 of the latch is operatively connected to a plunger 263 arranged in a solenoid 264. The solenoid 264 is connected in circuit with the driving motor 34 and is accordingly energized while the motor is running.

The power supply 266 is connected to a conventional motor starter 267 which may be operated manually as by buttons 268 to energize the motor circuit 269 and also contains means operable upon overload in the circuit 269 to open the circuit. The circuit 270 connects the solenoid 264 with the motor circuit 269. Accordingly, when the machine is stopped by manual operation of the control device 267, or the machine is stalled, the circuit 269 is automatically opened or disconnected from the power supply 266 and simultaneously, the solenoid 264 is deenergized permitting the latch 258 to move about the pivot 259 under the influence of the weight of the rear end 262 of the latch, the weighted portion 265 thereof and the weight of the plunger 263 and effect disengagement of the pawl 260 from the projection 261. Thereupon, the counter-weight 257 will overbalance the oven 105 and move it to elevated position to reduce the heat transfer from the elements 109 to the caps that may be then positioned in the oven. This reduction in the heat transfer is sufficient to permit the caps to remain for an indefinite period within the oven without becoming overheated or damaged.

Figure 2:
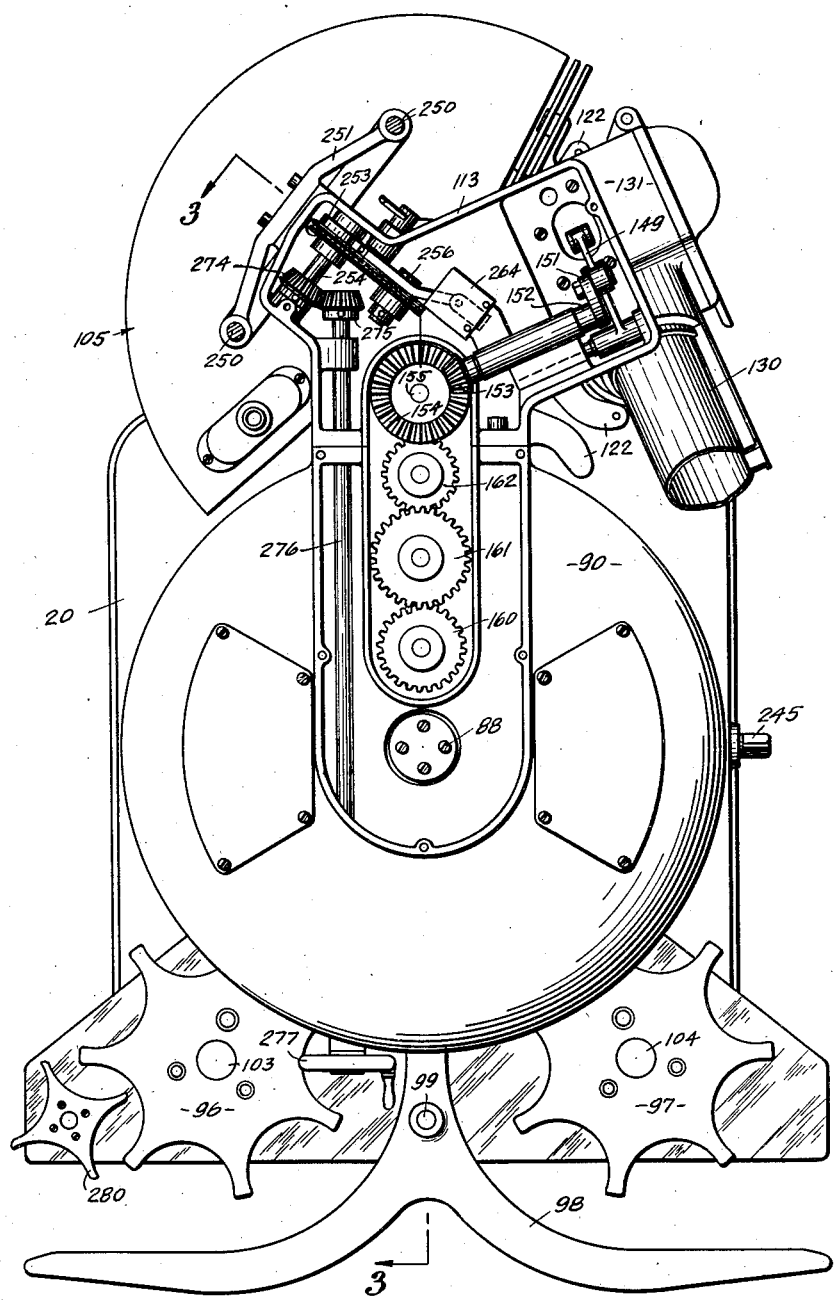
Figure 2 is a top plan view of the machine with parts removed.

The invention also includes means whereby the operator may conveniently reset the oven to normal cap heating position. A pinion 274 is secured to the shaft 254 and is arranged to mesh with a pinion 275 secured to the end of a shaft 276 journaled horizontally in the stop section 90 and housing 113, and extending to the front of the machine and being provided with a hand wheel 277. With this arrangement, the operator can reset the oven by turning the hand wheel 277 in a counter-clockwise direction Figure 2.

It will be understood by those familiar with bottle capping machines that the bottles B are filled on a filling machine and conveyed to the capping machine as by the conveyor 95, and that the bottles are often not uniformly spaced on the conveyor 95. Accordingly, the bottles may not properly register with the pockets or recesses in the star wheel 96. In order to insure proper timed relation between the movement of the bottles by the conveyor 95 and the movement of the star wheel 96, a gate wheel 280 is arranged to engage the bottles just prior to their entrance into the pockets of the star wheel. The gate wheel 280 is secured to a member 281 rotatably journalled on the upper end of a stud 282 mounted in the top wall of the base 20. The member 281 is provided with a plurality of cam teeth 283 arranged in a predetermined position relative to the arms of the gate wheel 280. The gate wheel is normally held against rotation by a lever 284 pivoted as at 285. One arm 286 of the lever is provided with a hook or latch 287 arranged to engage the teeth 283. The arm 286 is yieldingly urged toward the member 281 by a helical compression spring 288. The opposite end 289 of the lever is formed with an angular portion 290 arranged to engage teeth or cam lobes 291 formed on a cam member 292 secured to the shaft 103. The teeth 291 of the cam member 292 are arranged in a predetermined position relative to the pockets of the star wheel 96. The arrangement is such that bottles moving along the conveyor 95 engage the arms of the gate wheel 280 and are held from further movement until the latch 287 is moved out of engagement with a tooth 283, which movement is effected by one of the teeth 291 engaging the projection 290. The bottle is then permitted to move with the conveyor 95 and is then in timed relation to the movement of the star wheel 96, whereby the bottle properly enters the pocket in the wheel.

What I claim is:

1. A machine for applying hood caps to bottles, the skirts of which caps are provided with a substance rendered adhesive by the application of heat; comprising a frame, bottle advancing means operable to advance uncapped bottles to a capping station, means for supporting a supply of caps, a cap heating device arranged intermediate said supply and said capping station, cap advancing means operable to advance caps from said supply to said capping station and during such advancement to successively position said caps in heat exchanging relation to said cap heating device, a motor operatively connected to said bottle and cap advancing means and operable to actuate the same, said cap heating device being movable out of heat exchanging relation to said caps, latch mechanism operable to hold said device in heat exchanging relation to said caps, and electro-responsive means energized concurrently with said motor and operable when energized to maintain said latch in holding position, said electro-responsive means being also operable upon interruption of the current to said motor to release said latch, and means operable to move said cap heating device out of heat exchanging position upon release of said latch.

2. A machine for applying hood caps to bottles, the skirts of which caps are provided with a substance rendered adhesive by the application of heat; comprising a frame, bottle advancing means operable to advance uncapped bottles to a capping station, means for supporting a supply of caps, a cap conveying member operable to convey caps from said supply to said capping station, and a cap heating member arranged intermediate said supply and said capping station, one of said members being movable relative to the other, a latch operable in latching position to maintain said movable member against movement and with said heating member in heat exchanging position to the caps on said conveyor member, electro-responsive means operable to release said latch from latching position, and means operable to effect movement of said movable member to reduce the heat transfer from said heating member to said caps.

3. A machine for applying hood caps to bottles, the skirts of which caps are provided with a substance rendered adhesive by the application of heat; comprising a frame, bottle advancing means operable to advance uncapped bottles to a capping station, means for supporting a supply of caps, cap advancing means operable to advance caps from said supply to said capping station, a cap heating device arranged intermediate said supply and said capping station and being movable toward and from said caps during the advancment thereof, means operable to urge said heating device from said caps to reduce the heat transfer thereto, latch means operable when in latching position to hold said heating device in heat exchanging relation to said caps, a motor operatively connected to said bottle and cap advancing means and operable to actuate the same, and an electro-responsive device operable upon interruption of the current to said motor to release said latch from latching position.

4. A machine for applying hood caps to bottles, the skirts of which caps are provided with a substance rendered adhesive by the application of heat; comprising a frame, bottle advancing means operable to advance uncapped bottles to a capping station, means for supporting a supply of caps, cap advancing means operable to advance caps from said supply to said capping station, a cap heating device arranged intermediate said supply and said capping station and being movable toward and from the caps on said cap advancing means, latch means operable when in latching position to hold said heating device in heat exchanging relation to caps on said cap advancing means, a motor operatively connected to said bottle and cap advancing means and operable to actuate the same, an electro-responsive device operable upon interruption of the current to said motor to release said latch from latching position, and means operable to move said heating device out of heat exchanging relation to said caps upon release of said latch.

5. A machine for applying hood caps to bottles, the skirts of which caps are provided with a substance rendered adhesive by the application of heat; comprising a frame, a bottle carrying turret rotatably mounted on the frame, means operable to feed uncapped bottles onto said turret and to transfer capped bottles from the turret, means for supporting a supply of caps, a cap conveyor arranged intermediate said supply and said turret, a cap transfer mechanism operable to successively transfer caps from said supply to said conveyor, and said conveyor being operable to convey the transferred caps and deposit the same on the tops of uncapped bottles carried by said turret, a cap heating oven arranged in juxtaposition to said cap conveyor and being normally positioned in heat exchanging relation to the caps on said conveyor, said oven being movable in a direction from said conveyor to effect reduction of heat transfer to said caps, means yieldingly urging said oven from normal heat exchanging position, a latch movably mounted upon the frame and being operable when in latching position to maintain said oven from movement, a motor operatively connected to said turret, cap transfer mechanism and cap conveyor, and being operable to actuate the same, an electro-responsive device connected in the circuit of said motor and being operable upon interruption of said circuit to effect movement of said latch out of latching position.

6. A machine for applying hood caps to bottles, the skirts of which caps are provided with a substance rendered adhesive by the application of heat; comprising a frame, a turret rotatably mounted on the frame and being operable to advance uncapped bottles to a capping station and to convey capped bottles from said station, a cap conveyor arranged in juxtaposition to said turret and operable to convey caps to bottles at said capping station, means for supporting a supply of caps, and transfer mechanism operable to transfer caps successively from said supply to said conveyor, a cap heating device arranged in juxtaposition to said conveyor and being normally positioned in proximity thereto and in heat exchanging relation to the caps carried thereby, said heating device being movable in a direction from said conveyor to reduce the heat transfer to said caps, a latch carried by the frame and operable when in latching position to maintain said heating device in normal position, a motor operatively connected to said turret, transfer mechanism and conveyor, and operable to actuate the same, a solenoid connected in circuit with said motor and being operable upon interruption of said circuit to release said latch from latching position, and means operable to cause said heating device to move out of normal position upon release of said latch.

7. A machine for applying hood caps to bottles, the skirts of which caps are provided with a substance rendered adhesive by the application of heat; comprising a frame, a turret rotatably mounted on the frame and being operable to advance uncapped bottles to a capping station and to convey capped bottles from said station, a cap conveyor arranged in juxtaposition to said turret and operable to convey caps to bottles at said capping station, means for supporting a supply of caps, and transfer mechanism operable to transfer caps successively from said supply to said conveyor, a cap heating device arranged in juxtaposition to said conveyor and being normally positioned in proximity thereto and in heat exchanging relation to the caps carried thereby, said heating device being movable in a direction from said conveyor to reduce the heat transfer to said caps, a latch carried by the frame and operable when in latching position to maintain said heating device in normal position, a motor operatively connected to said turret, transfer mechanism and conveyor and operable to actuate the same, a solenoid connected in circuit with said motor and being operable upon interruption of said circuit to release said latch from latching position, means operable to cause said heating device to move out of normal position upon release of said latch, and means carried by the frame and manually operable for resetting said heating device to normal position.

8. A machine for applying hood caps to bottles, the skirts of which caps are provided with a substance rendered adhesive by the application of heat; comprising a frame, a turret rotatably mounted on the frame and being operable to advance uncapped bottles to a capping station and to convey capped bottles from said station, a cap conveyor arranged in juxtaposition to said turret and operable to convey caps to bottles at said capping station, means for supporting a supply of caps, and transfer mechanism operable to transfer caps successively from said supply to said conveyor, a cap heating device arranged in juxtaposition to said conveyor and being normally positioned in proximity thereto and in heat exchanging relation to the caps carried thereby, said heating device being movable in a direction from said conveyor to reduce the heat transfer to said caps, a latch carried by the frame and operable when in latching position to maintain said heating device in normal position, a motor operatively connected to said turret, transfer mechanism and conveyor, and operable to actuate the same, a solenoid connected in circuit with said motor and being operable upon interruption of said circuit to release said latch from latching position, means operable to cause said heating device to move out of normal position upon release of said latch, and manually operable means carried by the frame and including gearing for resetting said heating device to normal position.

9. A capping machine comprising a base, a bottle carrying turret rotatably mounted upon the base, means operable to feed uncapped bottles onto said turret and to transfer capped bottles from the turret, a cap conveyor arranged in juxtaposition to said turret, means for supporting a plurality of caps in stack formation, a cap heating oven, cap transfer mechanism operable to transfer the caps from said supply to said conveyor, said conveyor being operable to transfer the caps through said oven and to deposit the caps on the tops of the bottles on said turret, a motor mounted in the base, a power circuit for said motor, motion transmitting means operatively connecting said motor to said turret and said cap conveyor, latch means operable to maintain said oven in heat exchanging relation to the caps on said conveyor, electro-responsive means operable upon interruption of said power circuit to release said latch, means operable to move said oven out of heat exchanging relation to the caps on said conveyor when said latch is released, and manually operable means for returning said oven to heat exchanging position.

10. A machine for applying hood caps to bottles, the skirts of which caps are provided with a substance rendered adhesive by the application of heat; comprising means operable to advance a procession of bottles, a cap heating means operable to heat a procession of caps and to deposit the heated caps on the tops of the bottles during the advancement thereof, means for supporting a supply of caps in stack formation, a cap transfer suction cup, motion transmitting means operable in timed relation to the advancement of the bottles to oscillate said cup between a position in engagement with the lowermost cap of said stack formation and a position in proximity to said cap heating means, a source of vacuum, valve mechanism, connecting said suction cup and said source of vacuum, a bottle actuatable controller arranged in juxtaposition to the advancement of said bottles and being operable upon engagement by each bottle to shift said valve mechanism to connect said suction cup to said source of vacuum, and cam means operable in timed relation to the advancement of said procession of bottles to shift said valve mechanism and connect said suction cup to atmosphere.

JOHN F. PRICE.